Aug. 8, 1950　　　　E. C. LANE　　　　2,518,031
FISH LURE
Original Filed Feb. 17, 1947
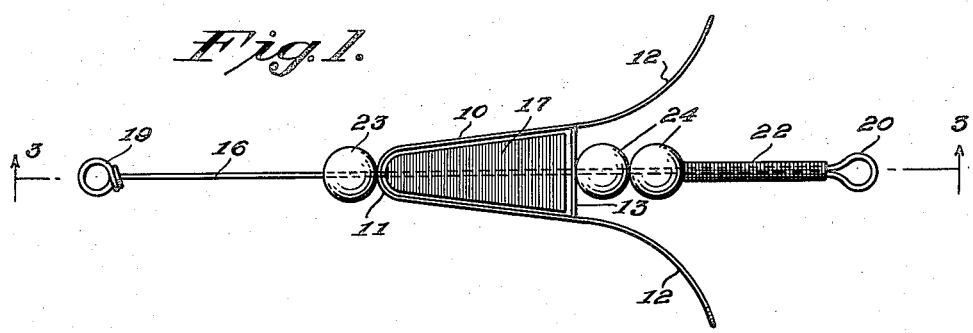
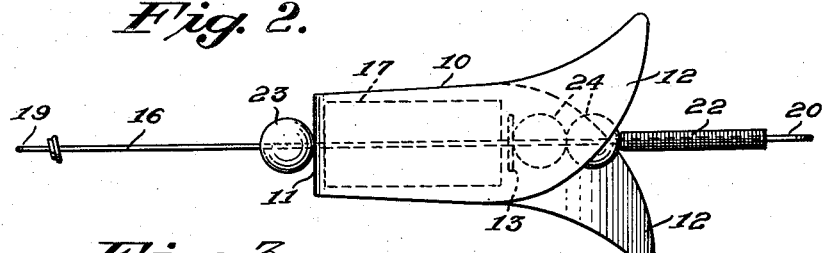
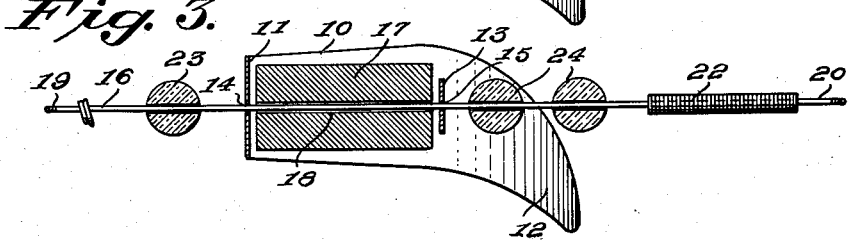
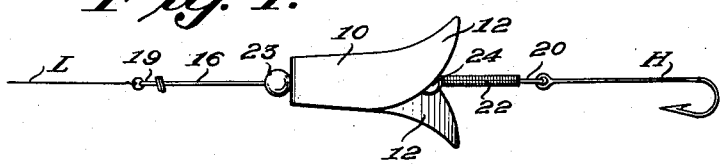
INVENTOR.
Edwin C. Lane
BY
James Atkins.
Attorney.

Patented Aug. 8, 1950

2,518,031

UNITED STATES PATENT OFFICE 2,518,031

FISH LURE

Edwin C. Lane, Wyoming, N. Y.

Continuation of application Serial No. 729,093, February 17, 1947. This application May 19, 1947, Serial No. 748,912

3 Claims. (Cl. 43—42.2)

This invention relates to a fish lure, and is a continuation of my now abandoned application filed February 17, 1947, Serial No. 729,093.

The invention is more particularly concerned with a fish lure in the form of an improved spinner adapted in its movement to more effectively attract fish to the lure.

The advantages of spinners have heretofore been appreciated, with the result that various forms thereof have been proposed and used. The spinner structures heretofore proposed or used, however, were relatively light in weight, as a result of which it was necessary to secure a sinker or weight to the leader or fish line apart from the spinner in order to effect proper casting of the spinner.

While the attachment of sinkers to the line materially aided in casting the spinner, such practice, however, presented a disadvantage substantially offsetting the advantage gained in casting or trolling.

Paramount of such disadvantages was the fact that the sinkers or weights which dangled unprotected from the line often became entangled in weeds, or lodged under rocks or the like, thereby causing a fisherman great inconvenience and often the loss of his bait as well as part of his line.

A primary object of the present invention, accordingly, is the provision of a weighted spinner wherein the weight is supported axially of the spinner and rearwardly of the advance end thereof, whereby the weight not only acts more effectively as an aid in casting, but is also protected by the spinner against entanglement with weeds or lodgment under rocks or the like.

A further object of the invention is the provision of a spinner having a weight supported within same for rotative movement with the spinner as well as movement relative to the spinner, whereby the weight periodically engages the spinner in the provision of bell-like sounds as a further aid in the attracting of fish.

A still further object of the invention is the provision of a weighted spinner of the character above referred to, wherein the weight is provided with visible colored surfaces which, upon rotation of the spinner and weight, reflect upon the walls of the spinner as a further aid in attracting the fish.

Other objects and advantages of the invention will become apparent in the course of the following detailed description taken in connection with the accompanying drawing, wherein:

Figure 1 is a top plan view of the improved weighted spinner in accordance with a preferred embodiment thereof.

Figure 2 is a side elevational view of the spinner.

Figure 3 is a longitudinal vertical section in the plane of line 3—3, Fig. 1.

Figure 4 is a side elevational view on a reduced scale showing the improved spinner in operative association with a hook and line.

Figure 5 is a fragmental elevational view showing the releasable hook-engaging means.

Referring now to the drawing, the spinner structure comprises a spinner body 10 which, as shown, is formed from a relatively thin strip of metal curved intermediate its ends as at 11, thereby providing a pair of wings 12. The wings 12, as shown in Fig. 1, arcuately diverge outwardly and, as shown in Fig. 2, the wings extend upwardly and downwardly in symmetrical relation to the longitudinal axis of the spinner.

A relatively thin metal partition 13 extends across the spinner in rearwardly spaced relation to the front curved portion 11, and such partition is rigidly secured to the opposed wings 12 for reinforcing same.

The portion 11 and partition 13 are respectively provided with apertures 14 and 15, through which loosely extends a thin wire spindle 16 which provides a bearing for the spinner body, which is not only rotatable about the spindle but is also movable lengthwise thereof, as indicated in Fig. 3, which shows that all elements supported on the spindle are freely movable lengthwise thereof.

An essential feature of the invention is a weight 17 which, in a preferred embodiment of the invention is disposed within the spinner body between the wings 12 and the portion 11 and partition 13. The weight 17 may be of any desired material, but is preferably formed from lead, and it is provided with a longitudinal aperture 18 of substantially greater diameter than the spindle 16, for reasons later to appear. Furthermore, the opposed visible sides of the weight 17 are brilliantly colored, as e. g., red, indicated in Fig. 1 for reasons hereinafter explained.

The front end of the spindle 16 is provided with an eye 19 for attachment of a line L (Fig. 4), and the rear end of the spindle is provided with an open eye 20 for removable attachment of a hook H (Fig. 4). The eye 20 is formed by spindle 16 and an extension 21 (Fig. 5), which normally diverges from the spindle for ready attachment or removal of the hook, and the eye is held closed by a coil spring 22 slidable along spindle 16, and whose internal diameter is such as to frictionally engage the spindle and extension 21 when drawn to the eye-closing position of Figs. 1 to 4.

A colored glass bead 23 is preferably loosely disposed on the spindle in advance of the spinner body, and a pair of similar beads 24 are loosely disposed on the spindle to the rear of the spinner body.

It is obvious that the elements 10, 17, 22, 23, and 24 can all be assembled on the spindle 16 prior to the formation of one or both eyes 19 and 20, and while in operation all such elements will by reaction of water on the spinner, be in the positions of Figs. 1, 2 and 4, they are shown in various positions on the spindle in Fig. 3 to indicate that they are all freely movable lengthwise of the spindle.

It is to be particularly noted that the weight 17 is of less dimensions than the space defined by wings 12, portion 11, and partition 13, as is clearly shown in Fig. 1, and since the aperture 18 is of substantially greater diameter than the spindle 16, the weight, while rotating with the spinner body 10, moves relative thereto, with its walls engaging the wings 12 and partition 13, which in action of the spinner produces bell-like sounds to attract fish in the surrounding area of the spinner.

Furthermore, the bright colored opposed faces of the weight, during rotation thereof, reflect on the walls of the wings 12, thereby further attracting the fish to the spinner.

From the above, it will be apparent that a weighted spinner is provided, wherein the weight is supported within the body of the spinner for rotation therewith, while having relative movement thereto in the production of sounds, and that the bright colored faces of the weight provide reflections, which, together with the rotation of the spinner and the bell-like sounds, provide for attraction of fish to the spinner.

It is to be noted that different size spinner structures are shown in the drawing and that larger or smaller structures may be provided according to the particular demands therefor.

It is to be observed that the spring 22 not only functions to close the hook-engaging eye 20, but further serves to cushion the spinner and weight assembly, and the bead or beads 24 provide an effective bearing for the partition 13 for free rotation of the spinner with a minimum of friction.

While I have disclosed my invention in accordance with a single specific embodiment thereof, such is to be considered as illustrative only, and not restrictive, the scope of the invention being defined in the subjoined claims.

What I claim and desire to secure by U. S. Letters Patent is:

1. A fish lure comprising an elongated spindle having a line-attaching eye at one end thereof and a hook-attaching eye at the other end thereof, a spinner comprising a pair of spaced wings united by a curved portion, a partition connecting the wings in spaced relation to said curved portion, said curved portion and said partition being apertured for receiving said spindle between said eyes and for rotatably supporting the spinner on the spindle, and a weight disposed between the wings, curved portion and partition and having an aperture extending therethrough for rotatably supporting the weight on the spindle, the walls of said weight being normally spaced from and parallel with the wings, and said aperture being of substantially greater diameter than said spindle for movement of the weight against the wings.

2. A fish lure comprising an elongated spindle, a spinner rotatably supported on the spindle and comprising a pair of elongated diverging wings united by a curved portion, a partition connecting the wings in spaced relation to said curved portion, the portions of the wings between said curved portion and said partition being plane and the remaining portions of the wings curving outwardly from the plane portions, the curved portion and partition being apertured for receiving said spindle centrally of the wings, and a tapered elongated weight of transverse rectangular cross section rotatably supported on said spindle between said curved portion and said partition.

3. The structure according to claim 2, wherein opposed sides of said weight converge toward said curved portion in substantial parallelism with said plane wing portions, and said converging sides merging into a rounded end portion adjacent said curved portion uniting the wings.

EDWIN C. LANE.

REFERENCES CITED

The following references are of record in the file of this patent:

UNITED STATES PATENTS

| Number | Name | Date |
|---|---|---|
| D. 148,254 | Rooke | Dec. 30, 1947 |
| 104,930 | Chapman | July 5, 1870 |
| 536,185 | Cook | Mar. 26, 1895 |
| 1,393,790 | Kenney | Oct. 18, 1921 |
| 1,427,147 | Barsch | Aug. 29, 1922 |
| 1,500,463 | Mattern | July 8, 1924 |
| 1,822,785 | Petrie | Sept. 8, 1931 |
| 1,897,291 | Andrews | Feb. 14, 1933 |
| 2,142,267 | Freeman | Jan. 3, 1939 |

FOREIGN PATENTS

| Number | Country | Date |
|---|---|---|
| 15,826 | Great Britain | A. D. 1903 |
| 625,507 | France | Apr. 25, 1927 |
| 626,536 | France | May 14, 1927 |